US012618272B2

(12) United States Patent
Zhou

(10) Patent No.: US 12,618,272 B2

(45) Date of Patent: May 5, 2026

(54) HIDDEN DOOR HANDLE, VEHICLE DOOR AND VEHICLE

(71) Applicant: XIAOMI EV TECHNOLOGY CO., LTD., Beijing (CN)

(72) Inventor: Haochen Zhou, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 102 days.

(21) Appl. No.: 18/374,869

(22) Filed: Sep. 29, 2023

(65) Prior Publication Data

US 2024/0418018 A1 Dec. 19, 2024

(30) Foreign Application Priority Data

Jun. 14, 2023 (CN) ......................... 202310707545.5

(51) Int. Cl.

*E05B 85/18* (2014.01)
*E05B 85/10* (2014.01)

(52) U.S. Cl.

CPC ............ *E05B 85/18* (2013.01); *E05B 85/103* (2013.01)

(58) Field of Classification Search

CPC ...... E05B 85/10; E05B 85/103; E05B 85/107; E05B 85/14; E05B 85/16; E05B 85/18; E05B 81/76; E05B 81/77; E05B 81/78

See application file for complete search history.

(56) References Cited

U.S. PATENT DOCUMENTS

| | | | | |
|---|---|---|---|---|
| 7,108,301 | B2 * | 9/2006 | Louvel | E05B 85/103 292/201 |
| 9,458,649 | B2 * | 10/2016 | Fujiwara | E05B 81/56 |
| 9,518,410 | B2 * | 12/2016 | Vasi | E05B 81/08 |
| 9,617,764 | B2 * | 4/2017 | Vasi | E05B 85/103 |
| 10,711,494 | B2 * | 7/2020 | Bingle | E05B 81/06 |
| 2013/0170241 | A1 | 7/2013 | Lesueur et al. | |

FOREIGN PATENT DOCUMENTS

| | | | |
|---|---|---|---|
| CN | 113153035 | A | 7/2021 |
| DE | 102013112705 | A1 | 5/2015 |
| DE | 102014107407 | A1 | 11/2015 |
| DE | 102020209655 | A1 | 2/2022 |
| FR | 2857684 | A1 | 1/2005 |
| FR | 2927432 | A1 | 8/2009 |

OTHER PUBLICATIONS

Translation of CN 113153035 (Year: 2021).*
European Patent Application No. 23207012.8 Search Report dated Apr. 19, 2024, 7 pages.

* cited by examiner

*Primary Examiner* — Christine M Mills
*Assistant Examiner* — Yahya Sidky
(74) *Attorney, Agent, or Firm* — Cozen O'Connor

(57) ABSTRACT

A hidden door handle includes: a base including an opening; a switch assembly on the base, configured to unlock a vehicle door; and a handle assembly, rotatably mounted to the base, and having an initial position and a first trigger position to which the handle assembly is rotatable inwardly from the opening. In the initial position, the handle assembly is at the opening, and in the first trigger position, the handle assembly triggers the switch assembly to unlock the vehicle door.

16 Claims, 4 Drawing Sheets

HIDDEN DOOR HANDLE, VEHICLE DOOR AND VEHICLE

CROSS-REFERENCE TO RELATED APPLICATION

This application is based on and claims priority to Chinese Patent Application No. 202310707545.5 filed on Jun. 14, 2023, the entire content of which is incorporated herein by reference.

BACKGROUND

In automobiles, door handles are required for opening side doors, and the doors may be pulled open by pulling the door handles. There are convex handles, semi-hidden handles, and hidden door handles, among which the hidden door handles can reduce wind resistance for the automobile overall.

SUMMARY

A type of hidden retractable door handle may include with a space for retraction of the handle, and after the handle is retracted, another space completely independent of the space for the retraction of the handle is provided and used to accommodate relevant structures for opening a vehicle door. Operation of corresponding mechanisms by the human hand in the space can open the vehicle door. That is, such a hidden retractable door handle needs has two independent spaces, and such a design adopts electric drive to retract the handle, resulting in a complex overall structure, high cost, and large weight.

The present disclosure relates to the field of door handles, and particularly to a hidden door handle, a vehicle door and a vehicle.

A hidden door handle according to a first aspect of the present disclosure includes: a base, including an opening; a switch assembly on the base, configured to unlock a vehicle door; and a handle assembly, rotatably mounted to the base, and having an initial position and a first trigger position to which the handle assembly is rotatable inwardly from the opening. In the initial position, the handle assembly is at the opening. In the first trigger position, the handle assembly triggers the switch assembly to unlock the vehicle door.

A vehicle door according to a second aspect of the present disclosure includes a hidden door handle. The hidden door handle includes: a base, including an opening; a switch assembly on the base, configured to unlock a vehicle door; and a handle assembly, rotatably mounted to the base, and having an initial position and a first trigger position to which the handle assembly is rotatable inwardly from the opening. In the initial position, the handle assembly is at the opening. In the first trigger position, the handle assembly triggers the switch assembly to unlock the vehicle door.

A vehicle according to a third aspect of the present disclosure includes a vehicle door having a hidden door handle. The hidden door handle includes: a base, including an opening; a switch assembly on the base, configured to unlock a vehicle door; and a handle assembly, rotatably mounted to the base, and having an initial position and a first trigger position to which the handle assembly is rotatable inwardly from the opening. In the initial position, the handle assembly is at the opening. In the first trigger position, the handle assembly triggers the switch assembly to unlock the vehicle door.

BRIEF DESCRIPTION OF DRAWINGS

The accompanying drawings are used to provide further understanding of embodiments of the present disclosure and constitute a part of the specification. The accompanying drawings are used to explain the present disclosure together with embodiments of the present disclosure, rather than limit the present disclosure.

DETAILED DESCRIPTION

Figure 1:
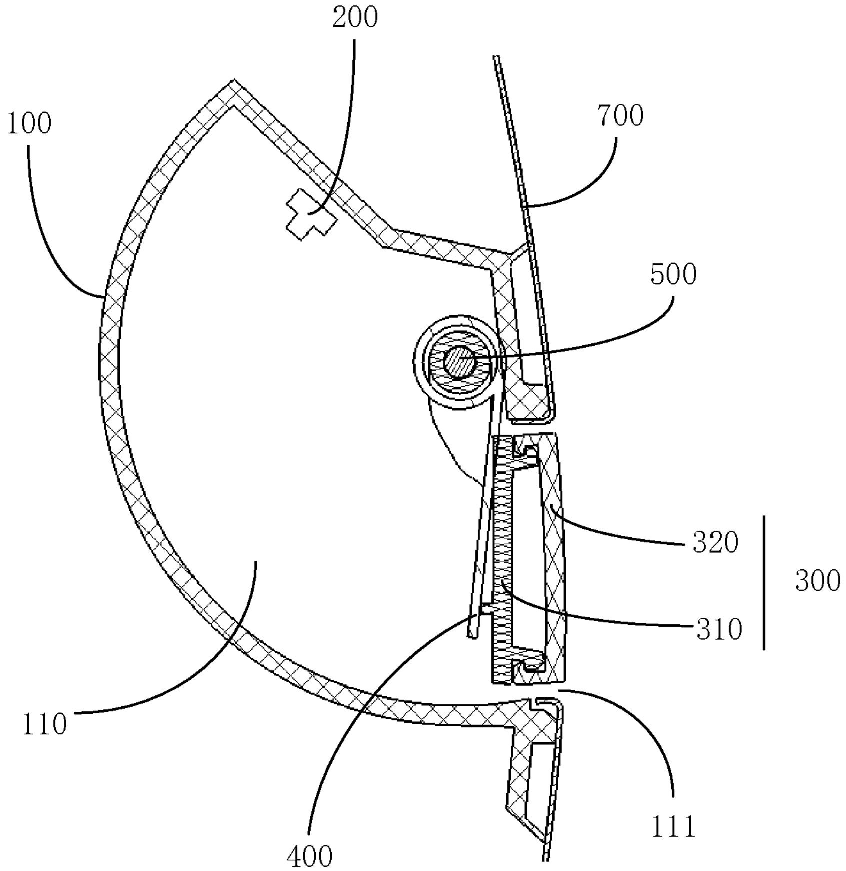
FIG. 1 is a schematic diagram of a hidden door handle according to some embodiments of the present disclosure, with a handle assembly in a hidden position.

Reference will now be made in detail to embodiments of the present disclosure, examples of which are illustrated in the accompanying drawings. It should be understood that the specific embodiments described herein are illustrative and explanatory, not construed to limit the present disclosure.

In the present disclosure, the use of directional words such as “inner” and “outer” refer to the inner and outer of the corresponding contour unless indicated to the contrary; in addition, the terms “first,” “second,” “third,” and the like, as used in the present disclosure, are intended to distinguish one element from another, not necessarily in order and importance. Furthermore, in the following description, when reference is made to the accompanying drawings, the same or similar elements are denoted by like reference numerals, unless otherwise specified. The foregoing definitions are merely illustrative and explanatory of the present disclosure and are not construed to limit the present disclosure.

As shown in FIGS. 1 to 7, according to a first aspect of the present disclosure, a hidden door handle is provided and includes: a base 100 including an opening 111; a switch assembly 200 on the base 100, configured to unlock a vehicle door 700; and a handle assembly 300 rotatably mounted to the base 100 and having an initial position (i.e., a hidden position) and a first trigger position to which the handle assembly 300 is rotatable inwardly from the opening 111. In the hidden position, the handle assembly 300 is at the opening 111. In the first trigger position, the handle assembly 300 triggers the switch assembly 200 to unlock the vehicle door 700.

For the hidden door handle according to the present disclosure, since the opening 111 is formed on the base 100 and the switch assembly 200 for unlocking the vehicle door

700 is on the base 100, the vehicle door 700 can be unlocked by using the handle assembly 300 rotatably coupled to the base 100, when the handle assembly 300 is switched from the hidden position to the first trigger position. For example, when the handle assembly 300 is in the hidden position, the vehicle door 700 can be locked without starting the switch assembly 200; when the handle assembly 300 is in the first trigger position, the switch assembly 200 is triggered, and the switch assembly 200 controls an unlocking structure (not shown) of the vehicle door 700 to unlock the vehicle door 700. For the hidden door handle according to the present disclosure, with the arrangement of the switch assembly 200 on the base 100, the inward rotation of the handle assembly 300 from the opening 111 and the switch from the hidden position to the first trigger position, an action of unlocking the vehicle door 700 can be realized, which eliminates the need for an electric drive assembly, has a simple structure is simple, and reduces both cost and weight.

In some embodiments, the base 100 is also configured as an accommodating cavity 110 with the opening 111; the switch assembly 200 is inside the accommodating cavity 110; and the handle assembly 300 is rotatably mounted in the accommodating cavity 110 and has the hidden position where the handle assembly 300 is at the opening 111, and the first trigger position where the handle assembly 300 triggers the switch assembly 200 to unlock the vehicle door 700. The handle assembly 300 rotates from the opening 111 to an interior of the accommodating cavity 110 to the first trigger position.

For the hidden door handle according to the present disclosure, since the accommodating cavity 110 having the opening 111 is formed in the base 100, and the switch assembly 200 configured to lock and unlock the vehicle door 700 is arranged in the accommodating cavity 110, the vehicle door 700 can be locked and unlocked by switching the handle assembly 300, rotatably connected in the accommodating cavity 110, between the hidden position and the trigger position. For example, when the handle assembly 300 is in the hidden position, the vehicle door 700 is locked without starting the switch assembly 200; when the handle assembly 300 is in the trigger position, the switch assembly 200 is started, and the vehicle door 700 is unlocked. For the hidden door handle according to the present disclosure, with the arrangement of one accommodating cavity 110 in the base 100, and the rotation of the handle assembly 300 from the hidden position toward the interior of the accommodating cavity 110 to the trigger position, the action of unlocking the vehicle door 700 can be realized, which eliminates the need for an electric drive assembly, has a simple structure is simple, and reduces both cost and weight.

It should be noted that the vehicle door 700 further includes the unlocking structure for locking and unlocking the vehicle door. For example, the unlocking structure may be configured as a drive assembly and a locking bolt coupled to the drive assembly, and the drive assembly may drive the locking bolt to switch between a locked state and an unlocked state, where the switch assembly 200 is in communication connection with the drive assembly, and the switch assembly 200 is configured to control the action of the drive assembly after the switch assembly 200 is triggered by the handle assembly 300, namely, when the switch assembly 200 is triggered by the handle assembly 300 in the first trigger position, the switch assembly 200 may control the drive assembly to switch the locking bolt from the locked state to the unlocked state for unlocking the vehicle door 700.

In an initial state, the handle assembly 300 is in the hidden position, and since the handle assembly 300 is away from the switch assembly 200, the vehicle door 700 may be in the locked state, and when it is required to unlock the vehicle door 700, the handle assembly 300 may rotate towards the interior of the accommodating cavity 110 to the first trigger position by being pushed by hand, and the switch assembly 200 is triggered for unlocking the vehicle door 700.

The switch assembly 200 can be triggered by the handle assembly 300 and can realize unlocking of the vehicle door when powered on, which is equivalent to electronic unlocking of the vehicle door. In some situations, a relevant component for the electronic unlocking fails to unlock the vehicle door through the switch assembly 200 when powered off, or in the event of malfunction. In order to satisfy the unlocking of the vehicle door 700 in a power-off state, as shown in FIGS. 3 to 6, in some embodiments of the present disclosure, the hidden door handle further includes an unlocking member 600 configured to unlock the vehicle door 700 in the power-off state. The unlocking member 600 may be configured in any suitable manner, as long as it can satisfy the above-mentioned unlocking of the vehicle door 700.

In some embodiments, the handle assembly 300 also has a second trigger position where the handle assembly 300 drives the unlocking member 600 to act on the unlocking structure of the vehicle door 700 to unlock the vehicle door 700. At least a portion of the unlocking member 600 is in a rotating path of the handle assembly 300 and may be abutted by the in-turned handle assembly 300 to achieve mechanical unlocking of the vehicle door 700.

It should be noted that the unlocking member 600 may be a structural member for directly locking the vehicle door, and the unlocking of the vehicle door 700 may be achieved by directly acting on the unlocking member 600 by the handle assembly 300. Moreover, the unlocking member 600 may also be a transition member coupled to the unlocking structure (such as the locking bolt) for locking the vehicle door, and the handle assembly 300 acts on the unlocking member 600, and the unlocking member 600 then drives the locking bolt to switch from the locked state to the unlocked state to achieve the mechanical unlocking of the vehicle door 700.

It may be understood that the handle assembly 300 may also act directly on the unlocking member 600 or indirectly on the unlocking member 600 through other intermediate assemblies, such as a linkage assembly, a suitable transmission assembly, etc. which will not be described in detail herein.

Figure 3:
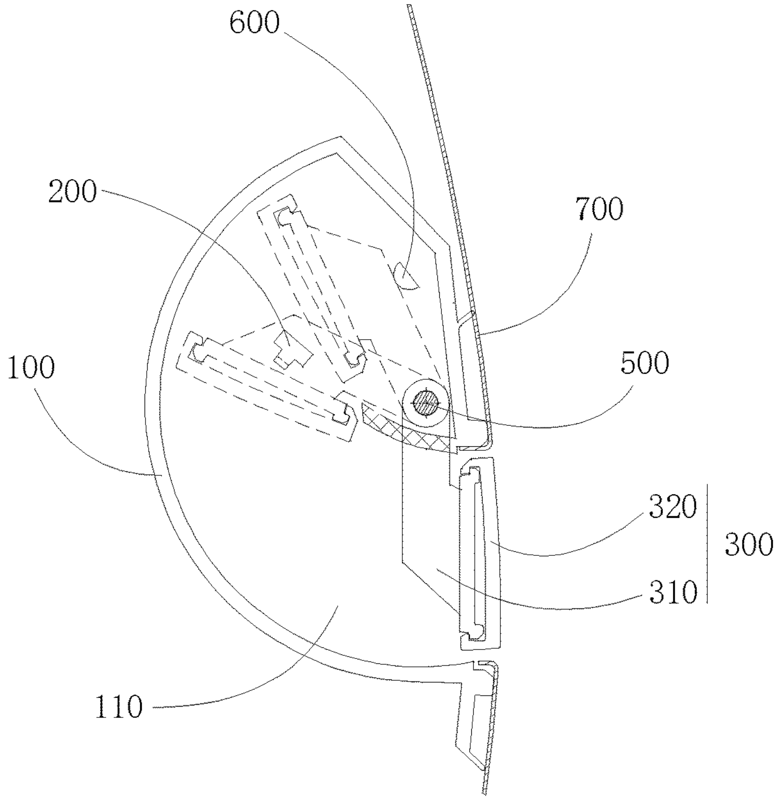
FIG. 3 is a schematic diagram of a hidden door handle according to some other embodiments of the present disclosure, with a handle assembly in a trigger position, a first trigger position and a second trigger position, and without showing a reset assembly.
Figure 4:
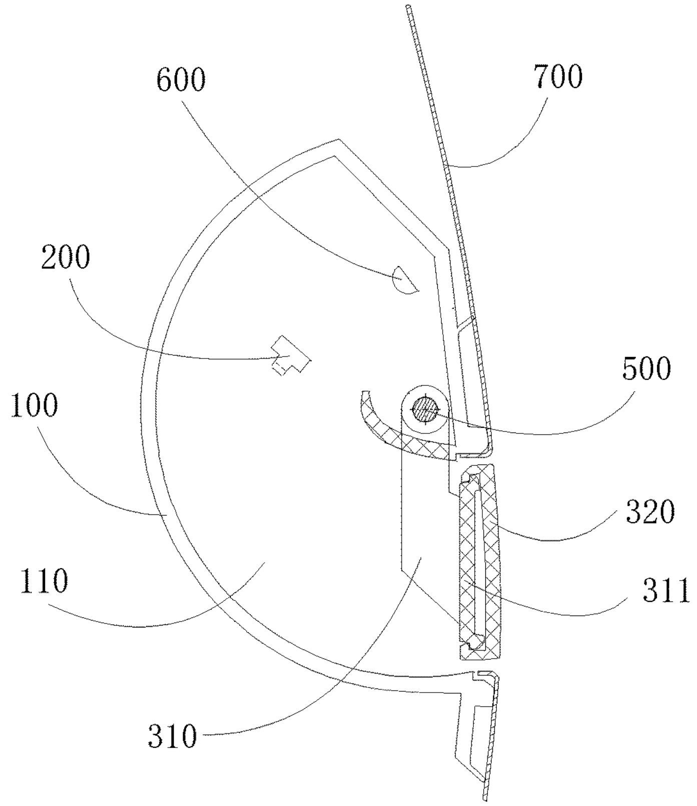
FIG. 4 is a schematic diagram of a hidden door handle according to some other embodiments of the present disclosure, with a handle assembly in a hidden position.
Figure 5:
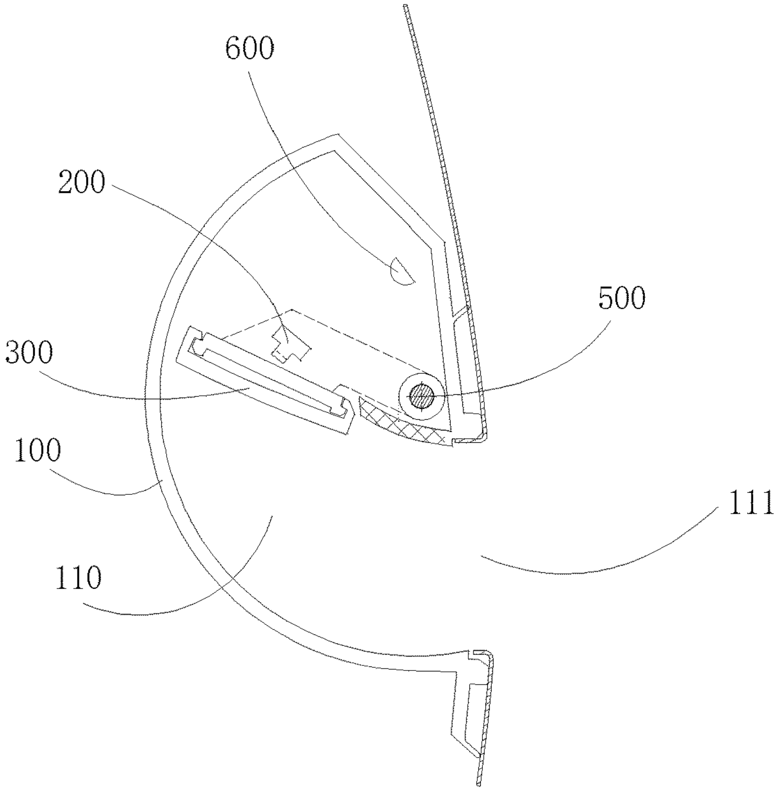
FIG. 5 is a schematic diagram of a hidden door handle according to some other embodiments of the present disclosure, with a handle assembly in a first trigger position.
Figure 6:
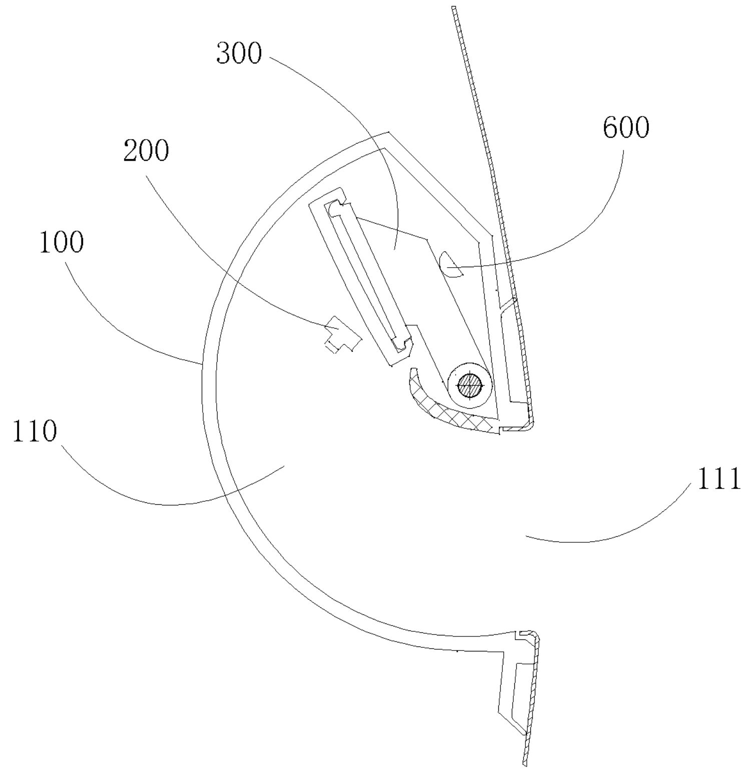
FIG. 6 is a schematic diagram of a hidden door handle according to some other embodiments of the present disclosure, with a handle assembly in a second trigger position.

As shown in FIG. 3, in some embodiments, comparing the first trigger position with the second trigger position, the first trigger position is closer to the opening 111. For example, both the first trigger position and the second trigger position are arranged in the accommodating cavity 110 of the base 100, and the handle assembly 300 first rotates to the first trigger position in the rotating path, and may rotate to the second trigger position with increase of a rotating angle when the handle assembly 300 is pushed to turn inward from the hidden position. That is to say, priority of electronically unlocking the vehicle door 700 through the switch assembly 200 should be higher than that of mechanically unlocking the vehicle door 700 through the unlocking member 600, which is more in line with actual operating habits.

In order to realize that the handle assembly 300 may be automatically reset from the first trigger position or the second trigger position to the hidden position after the vehicle door 700 is unlocked, as shown in FIG. 1, in some embodiments of the present disclosure, the hidden door handle further includes a reset assembly 400, and the reset assembly 400 is configured to drive the handle assembly 300 to switch from the first trigger position to the hidden position, or the reset assembly 400 is configured to drive the handle assembly 300 to switch from the second trigger position to the hidden position.

The reset assembly 400 may be configured in any suitable manner. In some embodiments, the reset assembly 400 includes an elastic member arranged in the accommodating cavity 110, and the elastic member has a first end coupled to the handle assembly 300 and a second end coupled to the base 100. The elastic member is between a back surface of the handle assembly 300 and the accommodating cavity 110, and two ends of the elastic member are coupled to the handle assembly 300 and an inner side of the accommodating cavity 110 respectively. When the hand pushes the handle assembly 300 to rotate inward, the elastic member is compressed to complete energy storage, and when the hand releases the handle assembly 300, the energy storage of the elastic member is released, and the handle assembly 300 is automatically reset to the hidden position from the first trigger position or the second trigger position under an elastic force of the elastic member. The elastic member includes but is not limited to a spring, and may also be an elastic sheet, an elastic rubber and the like with elastic function.

Rotating connection between the handle assembly 300 and the base 100 may be realized in any suitable manner. In some embodiments, the handle assembly 300 is hinged to the base 100 through a rotation shaft 500, and the handle assembly 300 may rotate around a central axis of the rotation shaft 500 to switch the hidden position and the first trigger position.

The reset assembly 400 includes a spring, the spring is fitted over the rotation shaft 500 or a mounting shaft coaxially provided with the rotation shaft 500, and the spring has a first end coupled to the base 100 and a second end coupled to the handle assembly 300.

In some embodiments, the spring may be fitted over the rotation shaft 500, and two ends of the spring are coupled to the base 100 and the handle assembly 300 respectively, to store energy when the hand pushes the handle assembly 300 to switch from the hidden position to the trigger position, and the handle assembly 300 is driven to automatically reset from the trigger position to the hidden position when the hand is released.

In other embodiments, the handle assembly 300 may be hinged to the base 100 through the rotation shaft 500, and the mounting shaft coaxially provided with the rotation shaft 500 is also formed on the handle assembly 300. The spring may be fitted over the mounting shaft, and two ends of the spring are also coupled to the base 100 and the handle assembly 300 respectively, to store energy when the hand pushes the handle assembly 300 to switch from the hidden position to the trigger position, and the handle assembly 300 may also be driven to automatically reset from the trigger position to the hidden position when the hand is released.

In some embodiments, the rotating connection between the handle assembly 300 and the base 100 may also be realized in the following ways: the handle assembly 300 includes a rotation portion 510 at each of two ends of the handle assembly 300, and the base 100 includes rotation grooves in one-to-one correspondence to the rotation portions 510, each of the rotation portions 510 being rotatably coupled to the corresponding rotation groove. It may be understood that the two rotation portions 510 are arranged coaxially, and a connecting line of the central axes of the two rotation portions 510 forms a rotating axis of the handle assembly 300, so that the handle assembly 300 may rotate more stably around the rotating axis, thereby switching between the hidden position, the first trigger position and the second trigger position.

In order to meet a rate when the handle assembly 300 returns to the hidden position from the first trigger position and the second trigger position, it is avoided that the handle assembly 300 directly impacts the opening 111 during quick return, which will affect use experience. In some embodiments, the hidden door handle further includes a damping assembly (not shown) which is provided at the base 100 and is coupled to the handle assembly 300, and is configured to control the return speed of the handle assembly when the handle assembly 300 is switched from the first trigger position and the second trigger position to the hidden position, to avoid noise generated when the damping assembly collides with the base 100 in the hidden position and improve the use experience.

It should be noted that the damping assembly may be configured in any suitable structure, for example, the damping assembly may adopt a rotating damper, a gear damper and the like.

The hidden door handle is designed based on requirement of reducing wind resistance of a vehicle. In order to further reduce the wind resistance, an outer surface of the handle assembly 300 does not protrude from the outer surface of the vehicle door 700 when the handle assembly 300 is in the hidden position. The outer surface of the handle assembly 300 may be flush with or slightly lower than the outer surface of the vehicle door 700 at the opening 111 when the handle assembly 300 is in the hidden position, which is beneficial to reducing the wind resistance. It should be noted that the outer surface of the vehicle door 700 is usually a door trim panel, which may be flat or arc-shaped, and the outer surface of the handle assembly 300 may also be flat or arc (for example, it may be configured with the same or similar radian as the door trim panel at the opening 111) to improve aesthetics of the whole vehicle.

Figure 2:
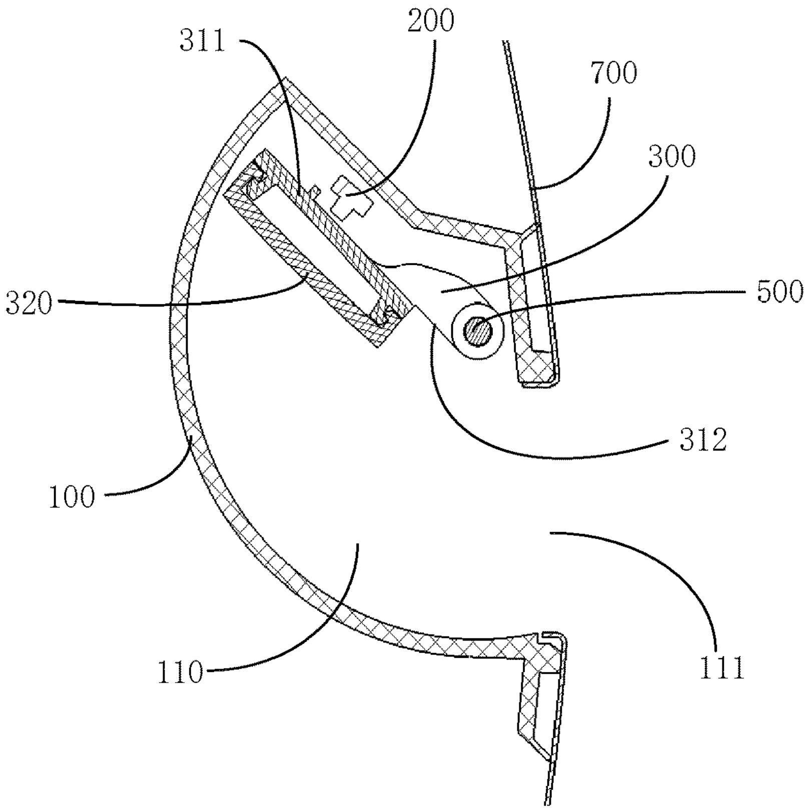
FIG. 2 is a schematic diagram of a hidden door handle according to some embodiments of the present disclosure, with a handle assembly in a trigger position and without showing a reset assembly.

In order to define the hidden position of the handle assembly 300, that is, to prevent the handle assembly 300 from protruding from the outer surface of the vehicle door 700 from the opening 111, as shown in FIG. 2, the handle assembly 300 includes a limiting structure 312 for defining the hidden position of the handle assembly 300. The limiting structure 312 may be designed with any suitable structure, for example, it may be a platform or a boss on the handle assembly 300. When the handle assembly 300 rotates to the hidden position, the platform or boss may abut against an inner wall of the accommodating cavity 110 at the opening 111 to limit the position of the handle assembly 300, to ensure that the outer surface of the handle assembly 300 does not protrude from the outer surface of the vehicle door 700, for example, the outer surface of the handle assembly 300 is flush with the outer surface of the vehicle door 700.

The handle assembly 300 may be configured in any suitable structure. As shown in FIGS. 1 and 3, in some embodiments, the handle assembly 300 includes a handle body 310, and the handle body 310 has a first end rotatably coupled to the base 100 and a second end forming a shielding portion 311 for shielding the opening 111. A size of the shielding portion 311 is adapted to a size of the opening 111, the limiting structure 312 may be formed on the handle body 310, and the outer surface of the handle body 310 cooperates with the inner side of the accommodating cavity 110 to realize position limiting.

It should be noted that a rotating form of the handle assembly 300 and the base 100 is not limited to the above-mentioned structure. In some embodiments, the rotation portion 510 may be formed on two opposite sides of the handle body 310, and rotating holes corresponding to the rotation portion 510 are formed on the two opposite sides of the opening 111 on the base 100, respectively. By mounting the rotation portion 510 in the rotating hole, the handle assembly 300 may rotate to switch the hidden position and the trigger position.

The spring for resetting may be provided at the rotation portion 510 and the rotating hole. It is also possible to configure the mounting shaft which coincides with the axes of the two rotation portions 510, and the same resetting function may be achieved by sheathing the spring on the mounting shaft.

Figure 7:
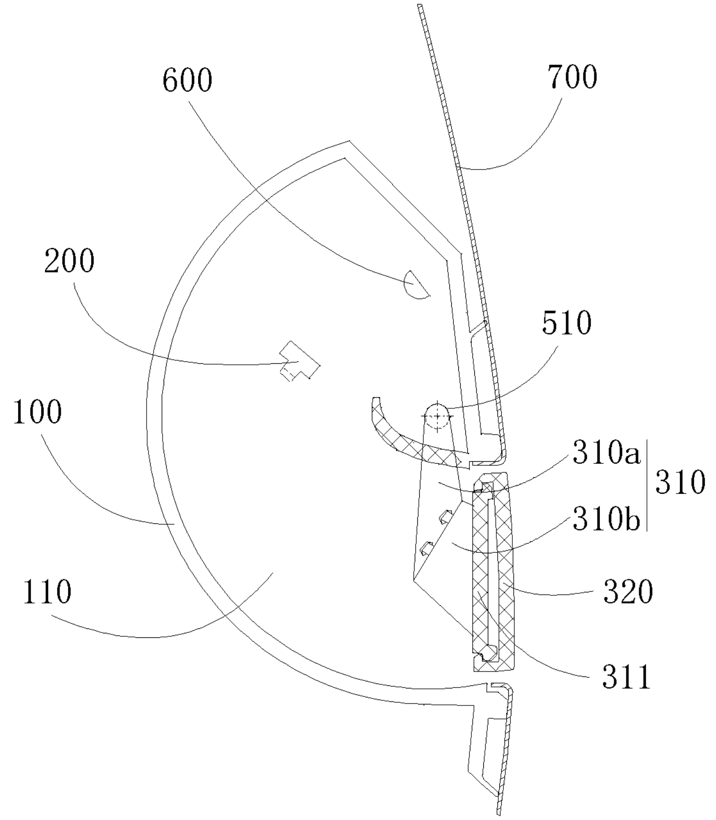
FIG. 7 is a schematic diagram of a hidden door handle according to yet other embodiments of the present disclosure, with a handle assembly in a hidden position.

As shown in FIG. 7, in some embodiments, the handle body 310 includes a first body 310*a* and a second body 310*b* which are coupled to each other. The first body 310*a* includes the rotation portion 510 rotatably coupled to the base 100, and the second body 310*b* includes the shielding portion 311. Since the rotation portion 510 is directly formed by the first body 310*a*, a structural size of the rotation portion 510 may be reduced, so that a rotating center of the whole handle assembly 300 may be closer to the outer surface of the vehicle door 700 in design, thereby reducing a depth of the accommodating cavity 110 of the base 100, facilitating manufacturing and reducing molding difficulty.

In some embodiments, the first body 310*a* is configured as a metal part, and/or the first body 310*a* and the second body 310*b* are detachably coupled to each other. The first body 310*a* and the second body 310*b* are detachably coupled to each other, and the first body 310*a* is configured as the metal part. Since the handle body 310 is configured as the first body 310*a* and the second body 310*b* which are detachably coupled to each other, connection between them is convenient. For example, the first body 310*a* may be mounted first, and then the second body 310*b* may be mounted, thus improving assembly efficiency. Moreover, due to the structural size of the rotation portion 510 is reduced, and strength of the rotation portion 510 is prevented from not meeting use requirements, the first body may be configured as the metal part, for example, a steel structure part, an aluminum alloy part, a titanium alloy part and the like to ensure use strength of the first body. Furthermore, the second body 310*b* may be made of any suitable material, for example, it may be made of an injection molded part or a metal structural part, which is not specifically limited here.

It may be understood that any suitable structure in the related art may be adopted in order to facilitate detachable connection between the second body 310*b* and the first body 310*a*, for example, a snap structure may be adopted, that is, a snap part is on the second body 310*b*, and a slot part is on the first body 310*a* corresponding to the snap part, so that the second body 310*b* and the first body 310*a* may be detachable coupled to each other by snapping the snap part in the slot part.

It should be noted that the first body 310*a* and the second body 310*b* may also be fixedly coupled to each other. Moreover, the first body 310*a* is configured as the metal part, and the second body 310*b* is coupled to the first body 310*a* and may not be disassembled, which may also meet the use requirements of the handle assembly 300.

In order to improve aesthetic effect, as shown in FIGS. 1 and 3, in some embodiments of the present disclosure, the handle assembly 300 further includes a decorative member 320, where the decorative member 320 is mounted on an outer side of the shielding portion 311. The decorative member 320 may be coupled to the outer side of the shielding portion 311 in the form of clamping and bonding, which is convenient to cooperate with the outer surface of the vehicle door 700 and improves overall aesthetics of the vehicle door 700.

The switch assembly 200 may be configured in any suitable structure. In some embodiments, the switch assembly 200 is configured to be triggered by contact when the handle assembly 300 abuts against the switch assembly 200 or by induction when the handle assembly 300 reaches a preset position, where the switch assembly 200 may be a mechanical structure. The switch assembly 200 starts a trigger when the handle assembly 300 abuts against the switch assembly 200, such as an electrically controlled push switch, a travel switch, a limit switch and the like. Furthermore, the switch assembly 200 may also be a non-contact distance sensor or a position sensor, that is, the switch assembly 200 may sense the trigger when the handle assembly 300 reaches the preset position, and may also unlock the vehicle door 700, such as an inductive switch. Contact-activated and contactless-activated switch assemblies 200 may refer to corresponding devices known in the related art, and will not be described in detail here.

It should be noted that the present disclosure is described around core components of the hidden door handle, and other control components and execution components used to unlock and lock the vehicle door 700 may refer to the technologies known in the related art, and will not be described here.

According to a second aspect of the present disclosure, the vehicle door 700 is provided, including the above-mentioned hidden door handle. Therefore, the vehicle door 700 also has all the advantages of the above-mentioned hidden door handle, which will not be described here.

According to a third aspect of the present disclosure, the vehicle is also provided, including the above-mentioned vehicle door. Therefore, the vehicle also has all the advantages of the vehicle door 700, which will not be described in detail here. The vehicle may also include the control component and the execution component for unlocking and locking the vehicle door 700, for example, including the drive assembly and the locking bolt for cooperating with the hidden door handle to lock and unlock the vehicle door 700.

With the hidden door handle, the vehicle door 700 and the vehicle of the present disclosure, the accommodating cavity 110 with the opening 111 is formed on the base 100, and the switch assembly 200 and the unlocking member 600 for unlocking the vehicle door 700 are arranged in the accommodating cavity 110, so that the vehicle door 700 is unlocked by switching the handle assembly 300 rotatably connected in the accommodating cavity 110 between the hidden position and the first trigger position and the second trigger position. When the handle assembly 300 is in the hidden position, the vehicle door 700 is locked without starting the switch assembly 200; when the handle assembly 300 is in the first trigger position, the switch assembly 200 is started, and the vehicle door 700 is unlocked, and when the handle assembly 300 is in the second trigger position, the vehicle door 700 is unlocked through the unlocking member 600. For the hidden door handle according to the present disclosure, only one accommodating cavity 110 is on the base 100, and the action of unlocking the vehicle door 700 may be realized when the handle assembly 300 rotates from the hidden position to the interior of the accommodating cavity 110 to the first trigger position or the second trigger position, so that the hidden door handle is operated by manual operation without the electric drive assembly compared with the related art, which is simple in structure, low in cost and beneficial to lightweight of a vehicle body. Further, the operation is more convenient, and the vehicle door 700 may be unlocked by operating the door handle at any time, regardless of whether the vehicle has electricity or not.

Some embodiments of the present disclosure have been described in detail with reference to the accompanying drawings, but the present disclosure is not limited to the specific details of the above embodiments, and various simple variations may be made to the technical solutions of the present disclosure within the scope of the present disclosure and fall within the scope of the present disclosure.

It should be noted that the specific technical features described in the above description may be combined in any suitable manner without contradiction. To avoid unnecessary repetition, various possible combinations are not explained separately in the present disclosure.

In addition, various embodiments of the present disclosure can be combined as long as they do not depart from the concept of the present disclosure, and should be construed as the content of the present disclosure.

What is claimed is:

1. A hidden door handle, comprising:

a base having an opening;

a switch assembly on the base, configured to unlock a vehicle door;

a handle assembly, rotatably mounted to the base, and having an initial position and a first trigger position to which the handle assembly is rotatable inwardly from the opening, and an unlocking member that unlocks the vehicle door;

wherein in the initial position, the handle assembly is at the opening, and in the first trigger position, the handle assembly triggers the switch assembly to unlock the vehicle door;

wherein the switch assembly is configured to be triggered by contact when the handle assembly abuts against the switch assembly; and wherein the handle assembly further has a second trigger position where the handle assembly drives the unlocking member to act on an unlocking structure of the vehicle door to unlock the vehicle door.

2. The hidden door handle according to claim 1, wherein comparing the first trigger position with the second trigger position, the first trigger position is closer to the opening.

3. The hidden door handle according to claim 2, wherein:

the base comprises an accommodating cavity in connection with the opening; and the switch assembly is inside the accommodating cavity, and the handle assembly is rotatable from the initial position to an interior of the accommodating cavity under push of an external force to switch to the first trigger position or the second trigger position.

4. The hidden door handle according to claim 1, further comprising a reset assembly that drives the handle assembly to switch from the first trigger position or the second trigger position to the initial position.

5. The hidden door handle according to claim 4, wherein the reset assembly comprises an elastic member having a first end coupled to the handle assembly and a second end coupled to the base.

6. The hidden door handle according to claim 5, wherein the handle assembly is hinged to the base through a rotation shaft.

7. The hidden door handle according to claim 5, wherein the handle assembly comprises a rotation portion at an end of the handle assembly, the base comprises a rotation groove in correspondence to the rotation portion, and the rotation portions is rotatably coupled to the corresponding rotation groove.

8. The hidden door handle according to claim 6, wherein the reset assembly comprises a spring fitted over the rotation shaft, and the spring has a first end coupled to the base and a second end coupled to the handle assembly.

9. The hidden door handle according to claim 7, wherein the reset assembly comprises a spring fitted over the rotation portion, and the spring has a first end coupled to the base and a second end coupled to the handle assembly.

10. The hidden door handle according to claim 1, wherein an outer surface of the handle assembly does not protrude from an outer surface of the vehicle door when the handle assembly is in the initial position.

11. The hidden door handle according to claim 10, wherein the handle assembly comprises a limiting structure configured to limit the initial position of the handle assembly.

12. The hidden door handle according to claim 1, wherein the handle assembly comprises a handle body, and the handle body has a first end rotatably coupled to the base and a second end forming a shielding portion for shielding the opening.

13. The hidden door handle according to claim 12, wherein the handle assembly further comprises a decorative member mounted on an outer side of the shielding portion.

14. The hidden door handle according to claim 12, wherein the handle body comprises a first body and a second body coupled to each other, the first body comprises a rotation portion rotatably coupled to the base, and the second body comprises the shielding portion.

15. A vehicle door, comprising a hidden door handle, wherein the hidden door handle comprises:

a base, comprising an opening;

a switch assembly on the base, configured to unlock the vehicle door;

a handle assembly, rotatably mounted to the base, and having an initial position and a first trigger position to which the handle assembly is rotatable inwardly from the opening, and an unlocking member that unlocks the vehicle door;

wherein in the initial position, the handle assembly is at the opening, and in the first trigger position, the handle assembly triggers the switch assembly to unlock the vehicle door;

wherein the switch assembly is configured to be triggered by contact when the handle assembly abuts against the switch assembly; and wherein the handle assembly further has a second trigger position where the handle assembly drives the unlocking member to act on an unlocking structure of the vehicle door to unlock the vehicle door.

16. A vehicle, comprising a vehicle door having a hidden door handle, wherein the hidden door handle comprises:

a base, comprising an opening;

a switch assembly on the base, configured to unlock the vehicle door; and a handle assembly, rotatably mounted to the base, and having an initial position and a first trigger position to which the handle assembly is rotatable inwardly from the opening, and an unlocking member that unlocks the vehicle door;

wherein in the initial position, the handle assembly is at the opening, and in the first trigger position, the handle assembly triggers the switch assembly to unlock the vehicle door;

wherein the switch assembly is configured to be triggered by contact when the handle assembly abuts against the switch assembly; and wherein the handle assembly further has a second trigger position where the handle assembly drives the unlocking member to act on an unlocking structure of the vehicle door to unlock the vehicle door.

* * * * *